3,267,078
POLYETHER URETHANE COATING COMPOSITION CURED WITH A DI-IMINE
Adolfas Damusis, Detroit, Mich., assignor to Wyandotte Chemicals Corporation, Wyandotte, Mich., a corporation of Michigan
No Drawing. Filed Dec. 16, 1963, Ser. No. 330,568
6 Claims. (Cl. 260—77.5)

This invention relates to novel coating compositions and more particularly to stable low temperature-curable polyurethane coating compositions containing blocked NCO-terminated intermediates.

In order to avoid the moisture instability of a one-component coating system and the difficulties of a two-component coating system, wherein the isocyanate-terminated intermediate and the material containing active hydrogen atoms remain separated until just prior to use, a procedure has been devised in the art for blocking the isocyanate groups. Blocking is simply a process in which the isocyanate group is reacted with a highly reactive material such as phenol. The use of a blocked isocyanate permits the isocyanate-terminated intermediate and the material containing active hydrogen atoms to be combined in a one-component system which is stable at room temperature. However, the one-component coating systems have the serious disadvantage of requiring high curing temperatures in order to liberate the blocking agent and thus reactivate the NCO groups to form stable urethane linkages with the reactive hydrogen containing compound. This disadvantage becomes extremely important when the material desired to be coated is leather or other heat sensitive materials. Heretofore one-component coating systems containing blocked isocyanate-terminated intermediates could not be used to coat heat sensitive materials. Another disadvantage of one-component coating systems containing blocked isocyanate-terminated intermediates is the relatively long curing time required to obtain a stable coating.

Therefore, it is an object of the present invention to provide a novel coating composition.

Another object is to provide a novel coating composition which is curable by exposure to moisture at room temperature or upon heating.

A still further object is to provide a coating process employing novel coating compositions.

Other objects will become apparent hereinafter.

These and other objects are accomplished by the curable polyurethane coating compositions which comprise on the basis of the total weight of the composition about 25 to 100 weight percent of a blocked isocyanate-terminated polyether-based urethane intermediate wherein said polyether has a molecular weight of about 134 to 6,000, and a diimine, and about 0 to 75 weight percent of an inert solvent.

It has been discovered that, by incorporating certain diimines in coating compositions containing blocked isocyanate-terminated intermediates, the coating compositions will cure in a few hours at room temperature (about 20° C.) without being heated or, alternatively, can be cured in a matter of minutes by heating. Thus, the compositions of this invention represent a one-component coating system which has the unique advantage of curing over a predetermined time period ranging from minutes to hours.

The diimines which are used in the composition of this invention have the formula:

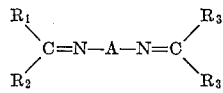

wherein R may be hydrogen, an alkyl radical having from 1 to about 6 carbon atoms or phenyl and A may be an alkylene radical having from 2 to about 6 carbon atoms such as ethylene, tetramethylene, pentamethylene and hexamethylene, or a nonvicinal arylene radical having from about 6 to 12 carbon atoms such as meta- and para-phenylene, meta- and para-diphenylene, meta- and para-xylylene, and naphthylene. Each of the R groups in the above formula may be the same or different from each of the others. Such diimine compounds are commercially available and may be prepared by reacting a diamine with a carbonyl compound such as a ketone or aldehyde. One such method of preparation is to reflux the carbonyl compound with the diamine in the presence of an azeotroping agent such as benzene, toluene or xylene. Some compounds which can be prepared by the above technique and which can be used in the coating compositions of the invention are as follows: 1,2-ethylene bis(isopentylidene imine), 1,2-hexylene bis(isopentylidene imine), 1,2-propylene bis(isopentylidene imine), p,p′-bisphenylene bis isopentylidene imine), 1,2-ethylene bis(isopropylidene imine), 1,3-propylene bis(isopropylidene imine), p-phenylene bis(isopentylidene imine), m-phenylene bis(isopropylidene imine), and 1,5-naphthylene bis(isopropylidene imine). The following are further illustrative of the compounds which corresopnd to the above formulae and which can be used in this invention:

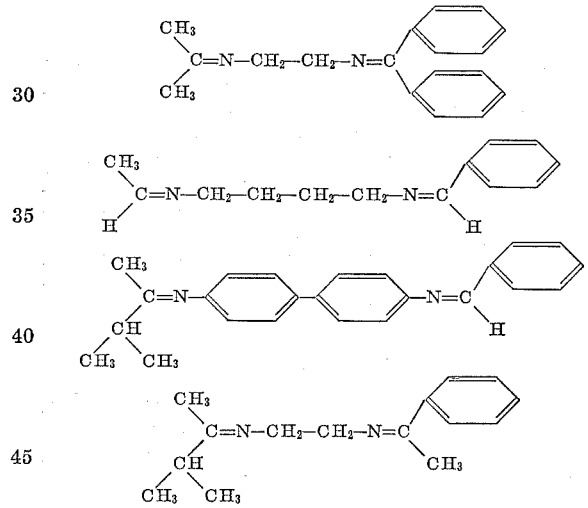

The isocyanate-terminated intermediates which may be employed in the coating compositions of this invention are the product of the reaction of polyether polymers with organic polyisocyanates. The reaction may be carried out either by reaction of a mixture of polyether polymers and organic polyisocyanates or by the sequential reaction of polyether polymers with organic polyisocyanates. Sequential reaction is necessary in some cases to prevent gelling caused by cross-linking during the reaction. The isocyanate-terminated reaction product is further reacted with a blocking agent such as phenol, cresol, ethyl acetyl acetate (diacetic ester), cyclohexanone oxime, or isopropanol to obtain the blocked isocyanate-terminated intermediate. The desired flexibility, impact and abrasion resistance, and solvent resistance of the coating can be obtained by proper control of the equivalent weight, chemical composition, and structure of the intermediates.

The polyether polymer is a product of the sequential addition of ethylene oxide, propylene oxide, and/or butylene oxide or mixtures thereof to a polyhydric alcohol until a polymer having a molecular weight of about 134 to 6,000 is produced. For the purpose of defining the present invention, the term "polyether polymer" includes the polyhydric alcohol itself where its molecular weight is at least 134.

If a polyalkylene ether glycol is used as the polyether polyol in this invention then the polyalkylene ether glycol should have a molecular weight in the range of about 134 to 3,000 in order to impart the more desirable properties in the final urethane composition. Should an alkylene oxide adduct of an alcohol having from 3 to 6 hydroxyl groups be used, then the polyether polyol can have a molecular weight in the range of about 134 to 6,000 which means that a triol could have about 40 oxyalkylene groups per hydroxyl.

The polyhydric alcohol employed in the preparation of the polyether polymers may be an alkanol or phenol and contains about 2 to 6 hydroxy groups and about 3 to 20 carbon atoms, as for example, propylene glycol, diethylene glycol, butane-1,4-diol, pentane-1,5-diol, hexane-1,3-diol, hexane-1,6-diol, glycerol, 1,1,1-trimethylolpropane, 1,1,1-trimethylolethane, hexane-1,2,6-triol, 4,4'-dihydroxyldiphenyl dimethyl methane, pentaerythritol, and sorbitol.

Representative of the typical organic polyisocyanates which may be used in preparing the blocked isocyanate-terminated intermediates of this invention are the diisocyanates such as m-phenylene diisocyanate, toluene-2,4-diisocyanate, hexamethylene-1,6-diisocyanate, tetramethylene-1,4-diisocyanate, cyclohexane 1,4-diisocyanate, naphthylene-1,5-diisocyanate, 1-methoxyphenyl-2,4-diisocyanate, diphenylmethane-4,4'-diisocyanate, and 4,4'-biphenylene diisocyanate; the triisocyanates such as 4,4',4"-triphenyl methane diisocyanate and toluene 2,4,6-triisocyanate; the tetraisocyanates such as 4,4'-dimethyldiphenyl methane 2,2',5,5'-tetraisocyanate and mixtures of polyisocyanates.

A typical example of the blocked isocyanate-terminated intermediates which may be employed in the coating compositions of this invention is the product of a process which comprises: first, mixing a polyether polyol with an organic diisocyanate in the proportion of about 2:1 to 3:2, inclusive, mols of polyol to diisocyanate at a temperature of about 20 to 100° C., the preferred range being 80 to 90° C. until a hydroxy-terminated adduct having a substantially constant viscosity is obtained; second, mixing the hydroxy-terminated adduct with about 1 molar proportion of an organic diisocyanate for each hydroxy group of the said adduct at a temperature of about 20 to 70° C., the preferred range being 50 to 60° C., until an NCO-terminated adduct having a substantially constant viscosity is obtained; and third, mixing the NCO-terminated adduct with about 1 molar proportion of a blocking agent for each NCO group at a temperature of about 80–100° C. until a blocked NCO-terminated adduct is obtained. The polyether polyol of the reaction can be (a) a straight-chain polyalkylene ether glycol having a molecular weight between about 134 and 3,000, preferably 400 to 1,000, or (b) a branched-chain alkylene oxide addition product of a polyhydric alcohol, said alcohol having at least 3 and not more than about 6 hydroxy groups and said addition product having on an average at least 1 and not more than 40 oxyalkylene groups per hydroxy group. In either case each oxyalkylene group contains about 2 to 4 carbon atoms. The blocking agent can be phenol, cresol, ethyl acetyl acetate (diacetic ester), cyclohexanone oxime or isopropanol.

Another example is the product of the process which comprises: first, mixing a polyether polyol with about 1 molar proportion of an organic polyisocyanate for each hydroxy group of said polyol at a temperature of about 20 to 70° C., the preferred range being 50 to 60° C., to produce an isocyanate-terminated adduct; second, mixing the isocyanate-terminated adduct with a polyalkylene ether glycol in the proportion of about 2:1 mols of adduct to glycol at a temperature of about 20 to 100° C., the preferred range being 80–90° C., to produce a longer chain length NCO-terminated adduct; and third, mixing the NCO-terminated adduct with about 1 molar proportion of a blocking agent for each NCO group until a blocked NCO-terminated adduct is obtained. In this case the polyether polyol is an alkylene oxide addition product of a polyhydric alcohol, said alkanol having at least 2 and not more than 6 hydroxy groups and said addition product having on an average at least 1 and not more than 40 oxyalkylene groups per hydroxy group and each oxyalkylene group contains about 2 to 4 carbon atoms. The polyalkylene ether glycol should have a molecular weight between about 134 and 3,000. The blocking agent can be phenol, cresol, ethyl acetyl acetate (diacetic ester), cyclohexanone oxime, or isopropanol.

The proportions of blocked isocyanate-terminated intermediate and diimine in the coating compositions may be varied over a wide range. Since the use of an amine introduces urea linkages to the coating it is possible to impart certain desired properties by careful controlling the quantity of diimine being used. In general, there should be about 0.8 to 2.2 amine equivalents to each isocyanate equivalent. In the primary diamines which are used in the compositions of this invention the equivalent number is, of course, 4. If 0.8 equivalents of diamine are reacted with 1 equivalent of isocyanate then a branched, NCO-terminated polymer is obtained which is brittle and has a high melting point. Should 2.2 equivalents of diamine be reacted with 1 equivalent of isocyanate then a low melting, flexible, polymer is produced having linear linkages and amine termination.

The solvents employed in the polyurethane coating compositions of this invention must be non-reactive to the blocked isocyanate-terminated urethane intermediates and diimines. They should be sufficiently low boiling that they will vaporize from the composition when coated onto a surface in a thin film. Many such solvents suitable in general for urethane coatings are known in the art, for example, 2-ethoxyethylacetate, methoxyethylacetate, butoxybutylacetate, toluene, xylene, amylacetate, other similar esters, ketones, chlorinated solvents, nitro-aliphatic solvents, dioxane, and the like.

The portion of solvent may be varied over a wide range. In some instances no solvent is used where a viscous or powdered coating composition is required. Generally, a composition containing about 70 weight percent of blocked isocyanate terminated intermediate and diimine, based on the weight of the over-all composition is a reasonable maximum considering that above this concentration the composition becomes very viscous or is a solid and becomes difficult to apply thus making the formation of good homogeneous films difficult. A practical lower limit is about 25 weight percent solids (blocked isocyanate terminated intermediate+diimine). Below this an unnecessary quantity of solvent is used and the films formed from lower concentrations are quite thin. In coatings, a preferred composition contains from about 50 to 65 weight percent, based on the weight of the entire composition, of blocked isocyanate terminated intermediate and diimine and about 50 to 35 weight percent of solvent.

The coating process of this invention comprises applying the polyurethane coating compositions presently described to various surfaces by conventional means, such as brushing, spraying, dipping, passing a heated object through the powdered coating composition or coating with a doctor blade. Due to the unique combination of reactants which are used in the compositions of this invention it is not necessary to heat the coating above room temperature in order to cure it. In general, the coatings of this invention will cure at about 20° C. The amount of time needed to cure the coatings at room temperature will vary with the amount of moisture which is in contact with it. That is, the more moisture the shorter the curing time. At a temperature of about 20° C. and 50% relative humidity the coating will cure in about 4 hours. When stored in air-tight containers the application properties of the compounds remain satisfactory for periods exceeding 6 months.

The following examples are presented to illustrate the invention but should not be used to unduly limit the scope of the invention. The molecular weights disclosed in the examples were calculated from the hydroxyl numbers of the compounds.

EXAMPLE 1

A series of urethane coating compositions was prepared containing a blocked isocyanate-terminated urethane intermediate and a diimine. The same blocked isocyanate-terminated urethane intermediate but a different diimine was employed in each composition. The coating properties of the compositions are presented in Table I. It will be noted that the compositions possessed excellent properties as well as the unique advantages of rapid curing at room temperature and long controllable pot life.

*Preparation of isocyanate-terminated intermediate (NCO-1-3D-Ph)*

| Reactants | Molar Proportions | | |
|---|---|---|---|
| | Mols | Parts | Weight Percent |
| Polyoxypropylene adduct of trimethylolpropane Pluracol TP-740 (M.W. 723) | 2 | 1,446 | 37.6 |
| Tolylene diisocyanate (1st portion) TDI (80/20; 2.4/2.6) | 1 | 174 | 4.5 |
| Tolylene diisocyanate (2d portion) | 4 | 696 | 18.0 |
| Phenol (1% excess) | 4 | 380 | 9.8 |
| Diethylcyclohexylamine 0.2% | | 4 | 0.1 |
| 2-ethoxyethyl acetate | | 576 | 15.0 |
| Toluene | | 576 | 15.0 |
| | | 3,852 | 100.0 |

Ratio of reactive groups NCO/OH = 1.66:.0.

*Procedure*

*Stage 1.*—Polyether polyols used in the reaction are preferably stripped of water by azeotropic distillation with benzene. In this manner, the amount of water can be decreased from 0.08–0.15 to 0.02% or even less.

174 parts of tolylene diisocyanate (TDI) were gradually added into a clean, dry, three-necked five-liter reaction flask containing 1446 parts of demoisturized Pluracol TP-740 with stirring. The temperature was kept below 90° C. by controlled addition of TDI to the Pluracol TP-740. After the exothermic reaction was finished the contents were heated at 80–90° C. and stirred for 3 hours. The abbreviated formula of the hydroxy-terminated intermediate at this stage is:

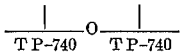

the circle representing the tolylene diisocyanate molecules, urethane linkages being omitted.

*Stage 2.*—Under a nitrogen blanket 696 parts of tolylene diisocyanate (TDI) were gradually added to the hydroxy-terminated intermediate. The temperature was kept below 70° C. by controlled addition of TDI to the intermediate. After the exothermic reaction was finished the contents were heated at 60° C. and stirred for 2 hours. The abbreviated formula of the isocyanate-terminated intermediate at this stage is:

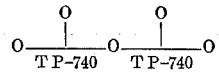

the circles representing the tolylene diisocyanate molecules, urethane linkages being omitted.

The isocyanate-terminated intermediate was diluted with 150 parts of 2-ethoxyethyl acetate and 150 parts of toluene to adjust the viscosity of the intermediate.

*Stage 3.*—Technical grade phenol used in the reaction was stripped of water by azeotropic distillation. 380 parts of phenol were diluted with a blend of 81 parts of 2-ethoxyethyl acetate and 81 parts of toluene to make a 70% phenol solution. The 70% solution plus 5% of benzene was charged into a distillation vessel and by azeotropic distillation the moisture was removed with the benzene.

The 70% phenol solution was cooled to 50° C. and added to the isocyanate-terminated intermediate along with 4 parts of diethylcyclohexylamine and heated for 2 hours at 80° C. The abbreviated formula of the blocked isocyanate-terminated intermediate at this stage is:

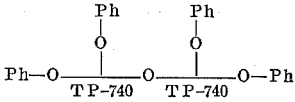

the circles representing the tolylene diisocyanate molecules, urethane linkages being omitted and Ph representing phenol.

The blocked isocyanate-terminated intermediate was diluted with 345 parts of 2-ethoxyethyl acetate and 345 parts of toluene to adjust the viscosity of the intermediate. The resulting solution was poured into a clean dry bottle and tightly capped.

Properties of NCO-1-3D-Ph:
    NCO/OH _____ 1.66/1.0
    Average molecular weight (calc.) _____ 2,684
    Average equivalent weight per —NCO group, 100% solids _____ 671
    Available NCO, percent _____ 6.28

Properties of NCO-1-3D-Ph solution:
    Average weight of solution per equivalent of NCO _____ 958
    Percent available NCO, on soln. basis _____ 4.38
    Brookfield viscosity at 25° C., cps. __ 7,000–8,500

The following coating compositions were prepared using the above blocked intermediate and various diimines.

A

| Components | Parts by Weight | |
|---|---|---|
| | Composition 1 | Composition 2 |
| (a) Phenol Blocked Isocyanate Terminated Intermediate (NCO-1-3D-Ph) | 958 | 958 |
| (b) CH₃\C=NCH₂—CH₂—CH₂N=C/CH₃ (with CH/CH₃ CH₃ groups) — 1,3-propylene bis(isopentylidene imine) | 59.5 | 119 |
| (c) Toluene | 53 | 69 |
| (d) 2-ethoxyethyl acetate | 53 | 69 |
| Amine equivalents per NCO equivalent | 1 | 2 |
| Percent of solids | 65 | 65 |

B

| Components | Parts by Weight | |
|---|---|---|
| | Composition 1 | Composition 2 |
| (a) Phenol Blocked Isocyanate Terminated Intermediate (NCO-1-3D-Ph) | 958 | 958 |
| (b) 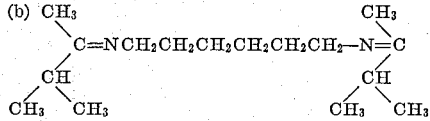 1,6-hexylene bis(isopentylidene imine) | 70 | 140 |
| (c) Toluene | 66 | 75 |
| (d) 2-ethoxyethyl acetate | 66 | 75 |
| Amine equivalents per NCO equivalent | 1 | 2 |
| Percent of solids | 65 | 65 |

C

| Components | Parts by Weight | |
|---|---|---|
| | Composition 1 | Composition 2 |
| (a) Phenol Blocked Isocyanate Terminated Intermediate (NCO-1-3D-Ph) | 958 | 958 |
| (b) 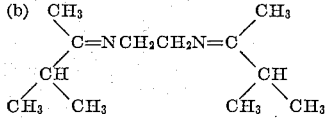 1,2-ethylene bis(isopentylidene imine) | 56 | 112 |
| (c) Toluene | 52 | 68 |
| (d) 2-ethoxyethyl acetate | 52 | 68 |
| Amine equivalents per NCO equivalent | 1 | 2 |
| Percent of solids | 65 | 65 |

D

| Components | Parts by Weight | |
|---|---|---|
| | Composition 1 | Composition 2 |
| (a) Phenol Blocked Isocyanate Terminated Intermediate (NCO-1-3D-Ph) | 958 | 958 |
| (b) 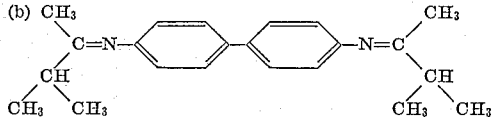 p,p'-biphenylene bis(isopentylidene imine) | 101 | 202 |
| (c) Toluene | 74 | 91 |
| (d) 2-ethoxyethyl acetate | 65 | 91 |

Table I shows that excellent coatings cured at low temperatures are attainable without sacrificing desirable properties. Furthermore, the results presented in the table reveal that the compositions of this invention not only cure at room temperature but, also, have an excellent pot life and cure time.

TABLE I.—PROPERTIES OF COATINGS FORMED FROM ABOVE DESCRIBED COMPOSITIONS

| Properties | A-1 | A-2 | B-1 | B-2 | C-1 | C-2 | D-1 | D-2 |
|---|---|---|---|---|---|---|---|---|
| Curing Temperature, °C | 21 | 20 | 19 | 19 | 24 | 24 | 20 | 20 |
| Curing Time, hrs. (50% Relative Humidity) | 2 | 2 | 2 | 2 | 2.5 | 2.5 | 2.5 | 2.5 |
| Pot Life, approx. hrs | 48 | 48 | 48 | 47 | 72 | 72 | 72 | 72 |
| Sword Hardness | 32 | 30 | 28 | 26 | 30 | 42 | 36 | 40 |
| Elongation, percent | 120 | 15 | 125 | 65 | 102 | 139 | 43 | 131 |
| Tensile Strength, p.s.i | 2,379 | 2,669 | 3,220 | 1,172 | 3,528 | 3,338 | 4,034 | 3,769 |
| 100% Modulus, p.s.i | 1,890 | -------- | 2,552 | -------- | 2,773 | 2,749 | -------- | 3,192 |
| Impact test, Gardner: | | | | | | | | |
| Direct (inch-lbs.) | >30 | >30 | >30 | >30 | >30 | >30 | >30 | >30 |
| Indirect (inch-lbs.) | >30 | >30 | >30 | >30 | >30 | >30 | 18 | >30 |
| Softening Point, °C | >145 | >145 | >145 | >145 | >145 | >145 | >145 | >145 |
| Solvent Resistance, hrs.: | | | | | | | | |
| Toluene | >24 | >24 | >24 | >24 | >24 | >24 | >24 | >24 |
| Cellosolve Acetate | >24 | 10 | 8 | 4 | >24 | 12 | 10 | 7 |
| Water Resistance: | | | | | | | | |
| 24 hrs. immersion, 25° C | N.E. | N.E. | N.E. | N.E. | N.E. | N.E. | N.E. | N.E. |
| ½ hr. immersion, 100° C | N.E. | N.E. | N.E. | N.E. | N.E. | Softens | N.E. | N.E. |

N.E. = No Effect.

EXAMPLE 2

This example illustrates room temperature coating compositions prepared from a linear block intermediate as opposed to the branched intermediate (NCO-1-3D-Ph) described above. The procedure was used to prepare the linear block intermediate (NCO-5-2D-Ph) was the same as used for NCO-1-3D-Ph) described in Example 1.

| Reactants (NCO-5-2D-Ph) | Molar Proportions | | |
|---|---|---|---|
| | Mols | Parts | Weight Percent |
| Polyoxypropylene diol Pluracol P-410 (M.W. 420) | 2 | 840 | 37.82 |
| Tolylene diisocyanate (1st portion) | 1 | 174 | 7.84 |
| Tolylene diisocyante (2d portion) | 2 | 348 | 15.66 |
| Phenol (1% excess) | 2 | 190 | 8.55 |
| Diethylcyclohexylamine (0.2%) | -------- | 3 | 0.13 |
| 2-ethoxyethyl acetate | -------- | 332 | 15.00 |
| Toluene | -------- | 332 | 15.00 |
| | | 2,219 | 100.00 |

Ratio of reactive groups used in preparation of NCO intermediate NCO/OH=1.5:1.0.

The abbreviated formula of the blocked isocyanate-terminated intermediate is:

Ph—O—O—O—Ph the circles representing the tolylene diisocyanate molecules, urethane linkages being omitted and Ph representing phenol.

Properties of NCO-5-2D-Ph:
- NCO/OH _____ 1.5/1.0
- Average molecular weight (calc.) _____ 1,546
- Average equivalent weight per —NCO group, 100% solids _____ 773
- Available NCO, percent _____ 5.43
- Nonvolatile, percent _____ 70

Properties of NCO-5-2D-Ph solution:
- Average weight of solution per equivalent NCO _____ 1,104
- Percent available NCO, on soln. basis ____ 3.8
- Brookfield viscosity at 25° C., cps. _____ 4,000–5,000

The coating compositions shown in Table 1 were prepared using the above blocked intermediate and various diimines.

E

| Components | Parts by Weight |
|---|---|
| (a) Phenol Blocked Isocyanate Terminated Intermediate (NCO-5-2D-Ph) | 1,104 |
| (b) 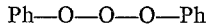 1,3-propylene bis(isopentylidene imine) | 89.7 |
| (c) Toluene | 67 |
| (d) 2-ethoxyethyl acetate | 67 |
| Amine equivalent per NCO equivalent | 1.5 |
| Percent of solids | 65 | where (b) is:

$$\begin{array}{c} CH_3 \\ \diagdown \\ C=NCH_2CH_2CH_2N=C \\ \diagup \\ CH \\ CH_3\ CH_3 \end{array} \quad \begin{array}{c} CH_3 \\ \diagdown \\ \\ \diagup \\ CH \\ CH_3\ CH_3 \end{array}$$

F

| Components | Parts by Weight |
|---|---|
| (a) Phenol Blocked Isocyanate Terminated Intermediate (NCO-5-2D-Ph) | 1,104 |
| (b) 1,6-hexylene bis(isopentylidene imine): $\begin{array}{c}CH_3\\ \diagdown\\ C=NCH_2CH_2CH_2CH_2CH_2CH_2N=C\\ \diagup\\ CH\\ CH_3\ CH_3\end{array}\ \begin{array}{c}CH_3\\ \diagdown\\ \\ \diagup\\ CH\\ CH_3\ CH_3\end{array}$ | 70 |
| (c) Toluene | 61 |
| (d) 2-ethoxyethyl acetate | 61 |
| Amine equivalents per NCO equivalent | 1 |
| Percent of solids | 65 |

G

| Components | Parts by Weight |
|---|---|
| (a) Phenol Blocked Isocyanate Terminated Intermediate (NCO-5-2D-Ph) | 1,104 |
| (b) 1,6-hexylene bis(isopentylidene imine) [structure: (CH₃)₂CH-C(CH₃)=NCH₂CH₂CH₂CH₂CH₂CH₂N=C(CH₃)-CH(CH₃)₂] | 105 |
| (c) Toluene | 71 |
| (d) 2-ethoxyethyl acetate | 71 |
| Amine equivalents per NCO equivalent | 1.5 |
| Percent of solids | 65 |

TABLE II

| Properties | Coating E | Coating F | Coating G |
|---|---|---|---|
| Curing Temperature, °C | 20 | 20 | 20 |
| Curing Time, hrs. (50% Relative Humidity) | 3 | 3 | 3 |
| Pot Life (hrs.) | 520 | 460 | 400 |
| Sword Hardness | 34 | 32 | 30 |
| Elongation, percent | 357 | 215 | 390 |
| Tensile Strength, p.s.i | 3,517 | 2,667 | 3,279 |
| (100% Modulus (p.s.i)) | 1,600 | 1,867 | 1,443 |
| Impact test, Gardner: | | | |
| Direct (inch-lbs.) | >30 | 20 | >30 |
| Indirect (inch-lbs.) | >30 | <4 | >30 |
| Softening Point, °C | >145 | 100 | 100 |
| Solvent Resistance, hrs.: | | | |
| Toluene | N.E. | N.E. | N.E. |
| Cellosolve Acetate | 1 | 1 | Dissolved |
| Water Resistance: | | | |
| 24 hrs. immersion, 25°C | N.E. | N.E. | N.E. |
| ½ hr. immersion, 100°C | Softened | Melted | Melted |

N.E.=No Effect.

The above data show that excellent coatings cured at room temperature may be prepared from linear as well as branched urethane intermediates.

The compositions of this invention are unique in that they form excellent low temperature curing urethane coatings. They also have good moisture stability as evidenced by their long pot life and are ideally suited for one-component coating systems. Accordingly, the objects of this invention have been met by blending a specific type of diimine with blocked isocyanate terminated intermediates.

I claim:

1. A polyurethane coating composition which comprises, on the basis of the total weight of the composition, about 25 to 100 weight percent of a diimine and a blocked isocyanate-terminated polyether based urethane intermediate in which said polyether has a molecular weight of about 134 to 6000, and about 0 to 75 weight percent of an inert solvent; the amounts of said intermediate and said diimine being such that upon curing of said composition there are present 0.8 to 2.2 amine equivalents for each isocyanate equivalent furthermore, said diimine having the formula:

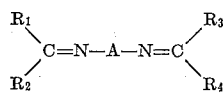

wherein R₁, R₂, R₃ and R₄ are radicals each independently selected from the group consisting of hydrogen, an alkyl having from 1 to 6 carbon atoms and phenyl and wherein A is a member selected from the group consisting of alkylene radicals having from about 2 to 6 carbon atoms and nonvicinal arylene radicals having from about 6 to 12 carbon atoms.

2. The composition of claim 1 wherein said blocked NCO-terminated polyether-based urethane intermediate is the product of a process which comprises: first, mixing a polyether polyol with an organic diisocyanate in the proportion of about 2:1 to 3:2, inclusive, mols of polyol to diisocyanate at a temperature of about 20 to 100° C. until a hydroxy-terminated adduct having a substantially constant viscosity is obtained; second, mixing the hydroxy-terminated adduct with about 1 molar proportion of an organic diisocyanate for each hydroxy group of the said adduct at a temperature of about 20 to 70° C. until an NCO-terminated adduct having a substantially constant viscosity is obtained; and third, mixing the NCO-terminated adduct with about 1 molar proportion of a blocking agent for each NCO group until a blocked NCO-terminated adduct is obtained; furthermore, said polyether polyol being a member selected from the group consisting of (a) polyalkylene ether glycols having a molecular weight between about 134 and 3,000 and (b) an alkylene oxide addition product of a polyhydric alcohol, said alcohol having about 3 to 20 carbon atoms and at least 3 and not more than 6 hydroxy groups and said addition product having on an average at least 1 and not more than 40 oxyalkylene groups per hydroxy group, and wherein each oxyalkylene group contains about 2 to 4 carbon atoms, and said blocking agent is a member selected from the group consisting of phenol, cresol, ethyl acetyl acetate (diacetic ester), cyclohexanone oxime, and isopropanol.

3. The composition of claim 1 wherein said diimine is 1,3-propylene bis(isopentylidene imine).

4. The composition of claim 1 wherein said diimine is 1,6-hexylene bis(isopentylidene imine).

5. The composition of claim 1 wherein said diimine is p,p'-biphenylene bis(isopentylidene imine).

6. A process of coating a surface which comprises contacting the surface with a composition of claim 1 and curing the composition by exposure to moisture.

References Cited by the Examiner

UNITED STATES PATENTS

| | | | |
|---|---|---|---|
| 3,036,020 | 5/1962 | Britain | 260—77.5 |
| 3,054,757 | 9/1962 | Britain | 260—77.5 |
| 3,127,436 | 3/1964 | Flynn | 260—77.5 |
| 3,134,755 | 5/1964 | Muller et al. | 260—77.5 |
| 3,156,658 | 11/1964 | Gmitter | 260—77.5 |

FOREIGN PATENTS 733,624   7/1955   Great Britain.

LEON J. BERCOVITZ, *Primary Examiner.*

M. C. JACOBS, *Assistant Examiner.*